United States Patent
Trinchero et al.

(10) Patent No.: US 7,605,713 B2
(45) Date of Patent: Oct. 20, 2009

(54) METHOD FOR CONTROLLING SEVERAL APPARATUSES WITH THE AID OF A LINK ATTACHED DEVICE AND SAID LINK ATTACHED DEVICE FOR CARRYING OUT SAID METHOD

(75) Inventors: Olivier Trinchero, Chaveton (FR); Jacques Mingot, Noisy le Roi (FR); Pascal Chevallier, La Celle Saint Cloud (FR)

(73) Assignee: Thomson Licensing, Boulogne-Billancourt (FR)

( * ) Notice: Subject to any disclaimer, the term of this patent is extended or adjusted under 35 U.S.C. 154(b) by 493 days.

(21) Appl. No.: 10/528,597

(22) PCT Filed: Sep. 19, 2003

(86) PCT No.: PCT/EP03/50642

§ 371 (c)(1), (2), (4) Date: Mar. 21, 2005

(87) PCT Pub. No.: WO2004/029897

PCT Pub. Date: Apr. 8, 2004

(65) Prior Publication Data

US 2006/0022865 A1 Feb. 2, 2006

(30) Foreign Application Priority Data

Sep. 27, 2002 (FR) .................................. 02 11954

(51) Int. Cl.
*G08C 19/12* (2006.01)

(52) U.S. Cl. .............. 340/825.22; 341/176; 340/825.72

(58) Field of Classification Search ............ 340/825.69, 340/72, 31, 825, 825.72; 341/176, 173
See application file for complete search history.

(56) References Cited

U.S. PATENT DOCUMENTS

| 4,566,034 A | | 1/1986 | Harger et al. |
| 4,825,200 A | * | 4/1989 | Evans et al. .................. 341/23 |
| 5,410,326 A | | 4/1995 | Goldstein |
| 5,854,594 A | | 12/1998 | Lin et al. |

(Continued)

OTHER PUBLICATIONS

8-In-1 Universal Remote Control (1990 Tandy Corporation), all pages.*

(Continued)

*Primary Examiner*—Brian A Zimmerman
*Assistant Examiner*—Yong Hang Jiang
(74) *Attorney, Agent, or Firm*—Robert D. Shedd; Robert B. Levy; Jorge T. Villabon (57) ABSTRACT

The present invention relates to a method of control of at least one electronic appliance with the aid of a distant device such as a remote control. The device comprises means of control, typically the keys of a keypad and a means of selection of an appliance from among several. The method comprises the following steps: activation of the device in a first mode where the means of control preferentially command the appliance selected by the means of selection, programming of at least one association between a means of control and an appliance, and activation of the associations so that the activation of a means of control commands the appliance associated during the programming step. The invention also relates to a device able to implement the method.

18 Claims, 4 Drawing Sheets

U.S. PATENT DOCUMENTS 5,949,151 A * 9/1999 Nakajima .................. 307/10.3
6,104,334 A * 8/2000 Allport ....................... 341/175
6,127,961 A * 10/2000 Stacy et al. ................. 341/176
6,130,624 A * 10/2000 Guyer .................... 340/825.69
6,992,612 B2 * 1/2006 Pessina et al. .............. 341/176
2004/0075602 A1 * 4/2004 Griesau et al. .............. 341/176

OTHER PUBLICATIONS

Search Report Dated Mar. 30, 2004.

* cited by examiner

METHOD FOR CONTROLLING SEVERAL APPARATUSES WITH THE AID OF A LINK ATTACHED DEVICE AND SAID LINK ATTACHED DEVICE FOR CARRYING OUT SAID METHOD

CROSS-REFERENCE TO RELATED APPLICATIONS

This application claims the benefit, under 35 U.S.C. § 365 of International Application PCT/EP03/50642, filed Sep. 19, 2003, which was published in accordance with PCT Article 21(2) on Apr. 8, 2004 in French and which claims the benefit of French patent application No. 0211954, filed Sep. 27, 2002.

FIELD OF THE INVENTION

Background

Numerous electronic appliances can receive signals transmitted by a remote control, thereby allowing a user to command these appliances remotely. Generally, these appliances are used in the multimedia field, for example: a television receiver, a video recorder, a DVD reader, a decoder, an amplifier, an audio CD reader, etc. The remote controls can also command computing appliances (for example PCs, printers, scanners, etc.) or home automation appliances (any domestic appliances linked or otherwise to a domestic network). The remote control is furnished with dedicated keys and with general-purpose keys (for example, those of the numerical pad). The dedicated keys allow the user to dispatch a command to the appliance, this command may be related directly to a specific function of the appliance such as control of the sound volume, contrast of the image, switch on or switch off, etc. The command may also be used by the user interface as a navigation element such as: shifting of the cursor, calling up of a menu, selection of an element highlighted on a display facility. The remote controls may also be furnished with a sensitive surface where the keys appear as shapes displayed on a graphics surface, an LCD screen displaying icons for example. The remote controls transmit a packet of signals containing an identification code for the appliance to be controlled and the code of the activated key corresponding to a command. The signal transmitted is optical (infrared for example), radio electric (with the aid of a wire), audible (ultrasound) or any other medium for transmitting digital data.

The generalization of remote controls for numerous appliances entails multiplication of the former. Let us assume a multimedia installation comprising a television receiver, a decoder, a video recorder, a DVD reader and an amplifier, the user has at its disposal five remote controls forming a cumbersome collection, the user often choosing the wrong one. To solve these problems, the user can equip himself with a universal remote control capable of commanding several appliances. The choice of the appliance to be commanded is performed for example with the aid of a switch having several positions or by pushbuttons associated with each appliance, the last pushbutton activated selecting the appliance to be controlled. Therefore, universal remote controls are more onerous to use than remote controls dedicated to a single appliance since, before transmitting a command, it is routinely necessary to specify which appliance the user wants to control. Hence, before the activation of a key of such a remote control, this key must be associated with the desired appliance.

Document U.S. Pat. No. 5,410,326—GOLDSTEIN describes a remote control allowing several appliances to be commanded in succession through a change of mode. It is furnished with a touch screen displaying icons that the user can select to execute commands. It is also furnished with means of connection for downloading an application suitable for the control of an appliance in particular. With the aid of a menu, the user selects the application corresponding to the appliance that he wants to control, then issues commands to this appliance. Hence the remote control described in this document does not possess a special mode where the user can control several appliances, without needing to select each appliance beforehand for each command.

Document U.S. Pat. No. 6,127,961—STACY describes a programmable remote control making it possible to control several appliances of different make and function. It is furnished with five LED diodes indicating the appliance to which the action in progress is relevant and with a means of entering a code for selecting the appliance according to make and function. A button makes it possible to select a determined appliance by switching on one of the LED diodes, neither therefore can the remote control command several appliances in a special mode, without needing to select each appliance beforehand for each command.

Recently, a subsidiary of the applicant manufacturing remote controls has produced associations of appliances/functions limited to certain very specific cases. For example, when the multimedia installation comprises a television receiver and an audio amplifier, the sound volume control can be effected at amplifier level or at television receiver level. The remote controls, called "Plasma", manufactured by the subsidiary of the applicant are identical for these two different appliances, they are furnished with a selector for assigning the remote control to a determined type of appliance. Depending on the position of the selector, the signals transmitted are intended for the appliance selected by the selector. However, this remote control is capable of dispatching sound control signals with the aid of its "SOUND+" and "SOUND−" keys to different appliances. To do this, in accordance with the instructions for using this remote control, the user must hold the "MENU" key and at the same time press the keys "9", "9", "9" to assign the television receiver sound command or press the keys "9", "9", "0" to assign the control of sound to the amplifier. The assignment is recorded in a non-volatile memory, there is no need to repeat the operation each time. For example, when the selector is positioned to VCR, the "SOUND+" and "SOUND−" keys control either the television receiver, or the amplifier and the keys from 1 to 9 and the Program+ and Program− keys control the change of stations on the video recorder.

Another example relates to "Plasma" remote controls used to control DVD readers, video recorders or television sets, which are also manufactured by the subsidiary of the applicant. These remote controls possess the "PLAY", "STOP", "REV", "FWD" and "PAUSE" keys intended for controlling the reading of a medium such as a video magnetic cassette or a DVD disc. When the selector is in the "TV" position, the appliance for which the signals transmitted during the activation of one of the keys are intended depends on the previous position of the selector. If the user has previously toggled the selector from the "VCR" position to "TV", the activation of one of these keys controls the video recorder. If this selector was in the "DVD" position before "TV", the activation of one of these keys controls the DVD disc reader.

These preceding examples show that it is known practice to associate keys with certain appliances on an ad hoc basis. However this association requires a complex operating sequence that the user does not always remember. Moreover, the associations are limited to very specific cases defined by the original manufacturer, thereby limiting the possibilities offered to the user.

The invention proposes a novel procedure for programming the functions of a remote control and a novel remote control solving the problems of the prior art, offering enhanced control possibilities and a simple and flexible way of commanding several appliances at the same time.

SUMMARY OF THE INVENTION

The invention relates to a method of control of at least one electronic appliance with the aid of a distant device such as a remote control comprising means of controlling and a means of selection of an appliance from amongst several, said method comprising a step of activating the device in a first mode where the means of control preferentially command the appliance selected by the means of selection, wherein it furthermore comprises:

a step of programming at least one association between a means of control and an appliance, a step of activating the device in a second mode so as to render active all the associations performed during the programming step, said activating step being triggered by the means of selection.

In this way, the user programs as many associations as he desires between commands corresponding to keys of his control device and the various appliances. Then, when he activates the associations by placing the device in a special mode, he can issue commands to various appliances by merely pressing the key corresponding to the desired command without having beforehand to modify the switch for selecting appliances so as to set it to the target appliance. Outside of this particular mode, the great majority of the keys control a single determined appliance.

According to a refinement, the method comprises a step of commanding associations during the programming step. Certain associations are prohibited and may not be carried out during this step, thereby precluding during the activation step the transmission of a signal to an appliance that may not execute the command.

According to another refinement, the method comprises a step of displaying a visual identifier of the appliance selected, when the device is in the second mode and when the user enters a command by activating the key associated with this appliance. The visual identifier reminds the user of which appliance the command is intended for.

According to another refinement, the device uses several sets of associations, each set being identifiable by a code. For example, a set of associations is tied to a user in particular. This user enters his code and when the device is in the second mode, the associations between the keys and the appliances are those that this user had previously programmed. The sets can also be associated with particular rooms of the residence, or else with a certain favoured type of appliance.

According to another refinement, the programming of the associations for a determined appliance is performed by firstly specifying the appliance and then indicating all the keys associated with this appliance one after the other. In this way, in a single go the user enters all the associations for an appliance before passing to another appliance, this being practical in particular when a new appliance is added to the others. A variant consists in doing the reverse: firstly the user chooses a key to be programmed, and then he successively selects the appliances that he wishes to associate with this key and which it will thereafter be possible to control with the latter.

The invention is also directed to a device for the remote control of a plurality of electronic appliances, comprising means of control and a means of selection of an appliance from among the plurality, the whole collection of means of control commanding in a favoured manner the appliance selected by the means of selection, characterized in that it comprises:

a means of programming of at least one association between at least one means of control and at least one appliance, a means of activation of all the associations programmed so that each associated means of control commands at least one appliance which is associated therewith by the programming means.

According to a first refinement, the means of activation uses a particular position of the selector that it is easy for the user to tag. In this way, the device no longer controls the selected appliance visibly but is in a state where all the associations are activated.

According to another refinement, the device comprises a means of selection of a key and a means of selection of several appliances, so that the key selected can control several appliances at one and the same time. Conversely and according to a variant, the device comprises a means of selection of an appliance and a means of selection of several keys at one and the same time, so that during programming, the user need not select the same appliance each time when he creates the associations relevant thereto.

According to another refinement, the device comprises a means of command of the programming of the associations, certain associations being prohibited. In this way, the device indicates during programming whether the association is or is not possible, thereby avoiding surprises during the activation and the use of the associations. According to another refinement, the device comprises a touch screen, whereon are displayed the various keys permitted to be associated with a previously selected appliance. A variant consists in the touch screen displaying the various appliances permitted to be associated with a previously selected key.

According to another refinement, the control device comprises a means of display for identifying the appliance or appliances of the plurality which is/are associated with the key currently activated when the device is in a second mode. Advantageously, the visual identifier is integrated into the means of selection.

According to another refinement, the means of selection consists of a switch having as many positions as appliances to be commanded plus a position activating the programmed associations.

BRIEF DESCRIPTION OF THE DRAWINGS

Other characteristics and advantages of the invention will now become apparent with greater details within the framework of the description which follows of exemplary embodiments given by way of illustration whilst referring to the appended figures which represented.

DETAILED DESCRIPTION

Figure 1:
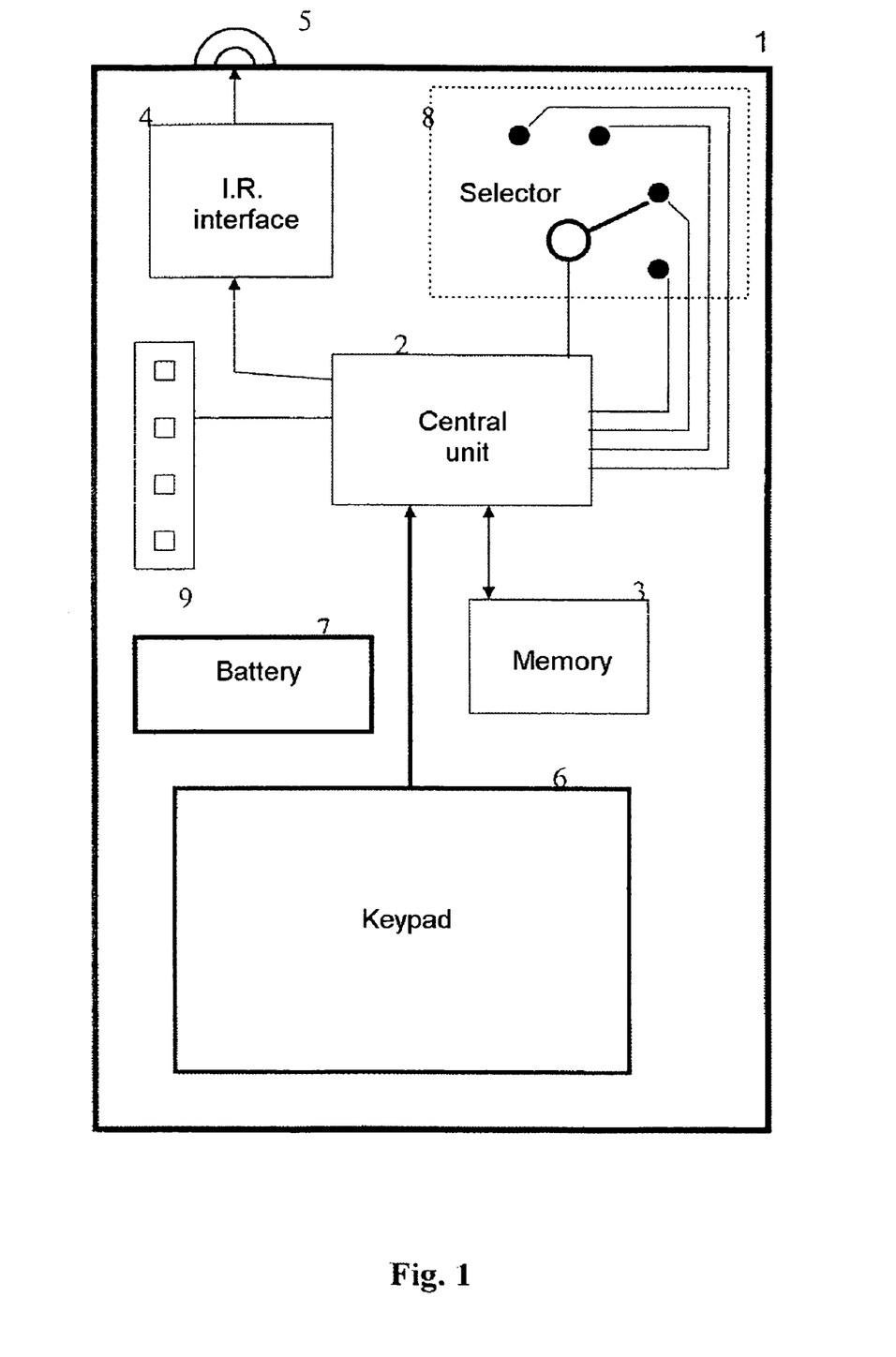
FIG. 1 presents a diagram of an internal architecture of the main elements of a remote control according to an exemplary embodiment of the invention.

FIG. 1 represents the main elements constituting an appliance control module according to an exemplary embodiment of the invention, typically a remote control. The remote control 1 is furnished: with a central unit 2 embodied for example in the form of a microprocessor, controlling the other elements: a memory 3 containing the executable program and data, advantageously, the memory 3 may be integrated into the microprocessor 1, a communication interface 4 for the shaping (modulation, amplification, etc.) of the signals transmitted by the remote control destined for the various appliances. The interface is connected to an infrared signals transmitter 5. Advantageously, the interface 4 can also be integrated into the microprocessor. The integration of the memory 3 and of the interface 4 is possible using a microcontroller as central unit 1.

The remote control is furnished with a keypad 6 which comprises a collection of keys electrically linking columns and rows (not represented) to the central unit 2, the executable program of the memory 3 comprises a module for decoding the rows and columns making it possible to determine the code of the key depressed on the keypad 6. According to the present exemplary embodiment, the keypad 6 comprises in particular the "CONFIGURATION" key and other keys such as: "SOUND+", "SOUND−", "PLAY", "MUTE", etc. The remote control is powered by a battery 7 supplying the energy for operation; a contact-less type power supply via photovoltaic cells for example is also possible. The remote control is furnished with a selector 8 comprising several positions, this selector allowing the user to choose between several appliances such as a television receiver, a video recorder, an amplifier, etc. A position of this selector activates the "MULTI" mode which makes it possible to control several appliances at one and the same time. A variant consists in replacing the selector 8 with a collection of keys of the keypad 6, the number of keys of the collection being equal to that of the positions of the selector 8. A second variant consists in combining the two: a selector for selecting the appliance and a key for activating the "MULTI" mode. The key being of higher priority than the selector, to exit the "MULTI" mode, it is necessary either to press the key a second time or to change the position of the selector 8. Optionally and according to a refinement which will be detailed later, the remote control 1 is furnished with visual indicators 9, typically LED diodes of different colours whose roles will be detailed later.

A variant to the selector 8 comprising several positions consists in using a pushbutton and several LED type pilot lights. With each pilot light representing an appliance, the pressing of the button turns off the LED that is on and turns on the next one, and so on and so forth, forming a procession. Through the indication of the pilot light being on, the user knows the appliance selected.

Figure 2:
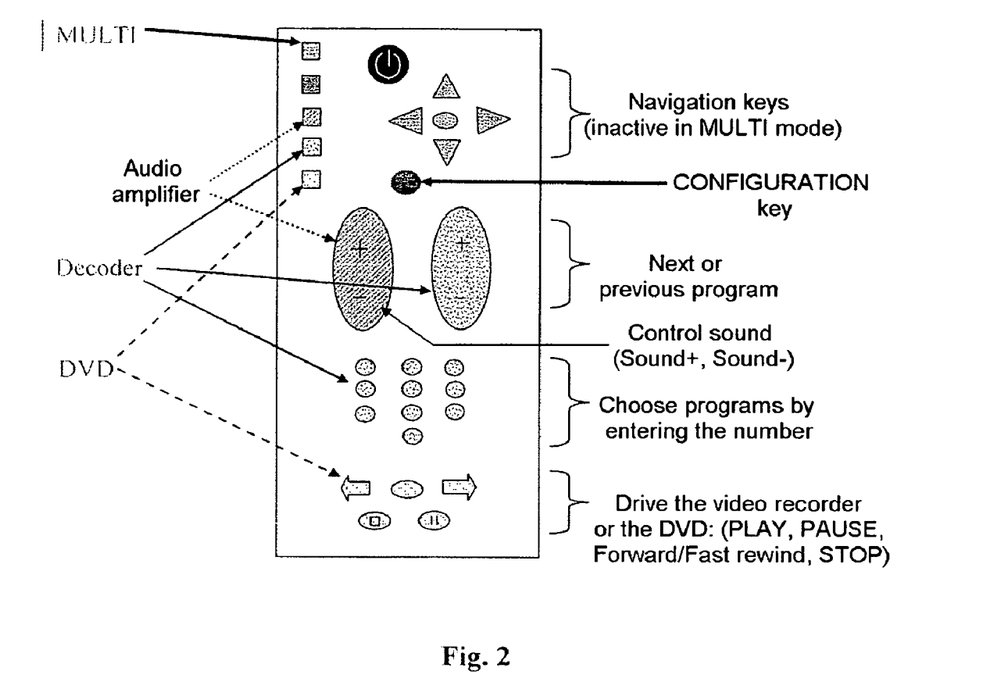
FIG. 2 illustrates a diagram of a remote control according to an exemplary embodiment of the invention.

FIG. 2 shows a diagram of the organization of the keys such as are at the user's disposal on the upper face of the remote control. Advantageously, the shape of the keys depends on their functions, thus the "SOUND+" and "SOUND−" keys are grouped together as a toggle with three positions, the middle position of which is the null position. The four direction keys form arrows oriented in four directions. The Off/On button of an appliance is easily distinguished. The selector 8 for choosing the various appliances and activating the "MULTI" mode is represented by a collection of keys in FIG. 2. The "CONFIGURATION" key situated in proximity to the selector 8 is clearly identified. According to an exemplary embodiment, when the selector is set to the "MULTI" position, FIG. 2 shows examples of associations between commands activated by keys and specific appliances: the "SOUND+" and "SOUND−" command buttons are associated with the audio amplifier, the "program+" and "program−" buttons and the numerical pad are associated with the decoder, and the "PLAY", "PAUSE", "FAST FORWARD", "FAST REWIND", "STOP" buttons are associated with the DVD reader. In the example of FIG. 2, the navigation buttons are not associated with any appliance and therefore have no effect in the MULTI position.

After having shown the various elements allowing the embodiment of an example of a control module, we shall now detail how these elements cooperate.

Figure 3:
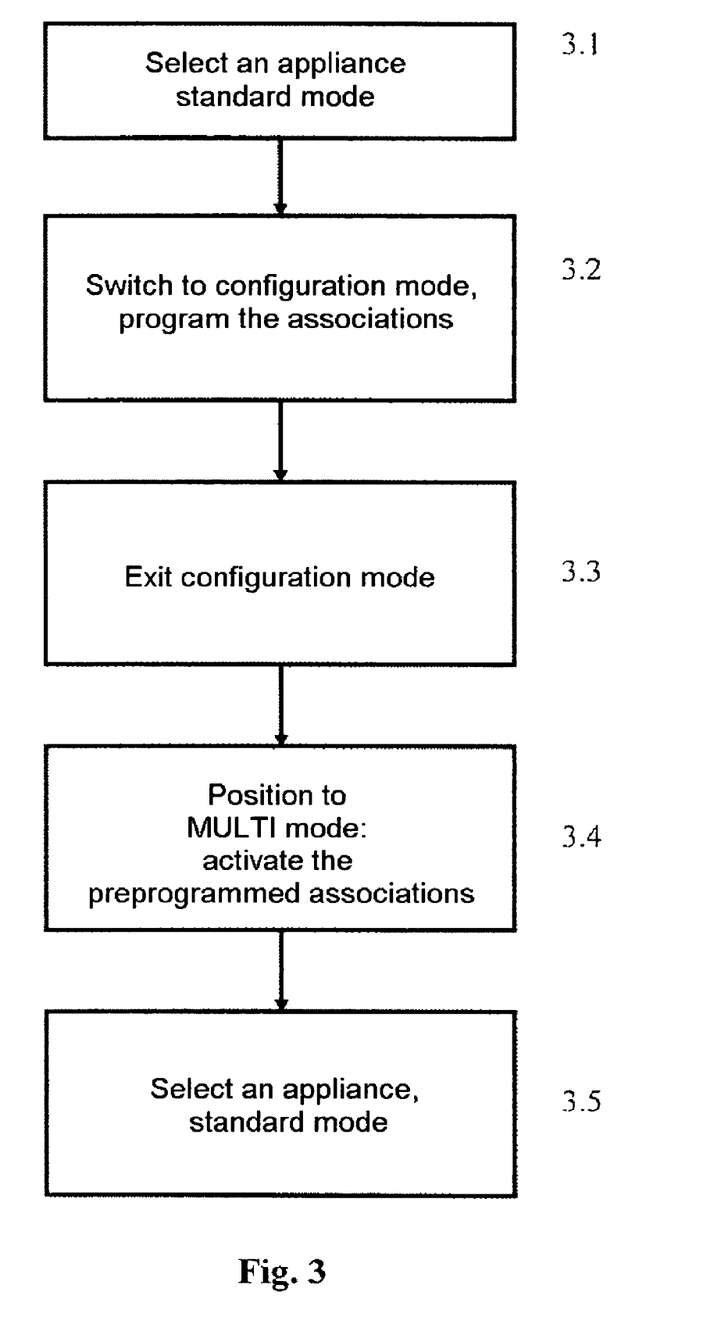
FIG. 3 is a flowchart representing the main steps for the implementation of an exemplary embodiment of the invention illustrated by FIG. 1.

FIG. 3 shows a flowchart representing the main steps for the implementation of an exemplary embodiment of the invention. Initially, in step 3.1, the selector 8 is positioned to any appliance whatsoever, this allowing the remote control 1 to command it preferentially, that is to say the majority of the keys command this appliance, and this is the standard mode. In step 3.2, the user presses the "CONFIGURATION" key thereby activating the execution of a special module of the executable program contained in the memory 3. In the course of step 3.2, the user programs the associations between commands and appliances. In the course of this step, the remote control does not transmit any infrared signals. Then in step 3.3, the user exits the configuration step by pressing the "CONFIGURATION" key a second time, the remote control can once again command the appliance determined by the position of the selector 8, as in step 3.1. In step 3.4, the user positions the selector 8 to "MULTI" mode. Following this action, the remote control is in a mode where all the associations programmed during step 3.2 are activated. Next (in step 3.5), when the user again wishes to control any one appliance by deploying all the functions available on the remote control 1, he changes the active position of the selector 8 and, positions it to this appliance, the behaviour of the remote control is the same as in step 3.1.

The switch to configuration mode can be performed in various ways. That described hereinabove is an example, it consists of a button which activates the mode upon the first press and deactivates it upon the second press. A variant consists in the remote control being in configuration mode as long as the "CONFIGURATION" button is depressed. The user presses a control key, thereby creating the association between this command and the appliance corresponding to the current position of the selector 8. In this way, inadvertent pressing of the "CONFIGURATION" button does not run the risk of creating a new association accidentally. Another variant consists in prolonged pressing (at least five seconds) of a control key allowing an association between the command corresponding to the key depressed and the appliance corresponding to the current position of the selector 8. This variant avoids the installation of a CONFIGURATION key on the remote control. Other processes are conceivable which do not depart from the subject matter of the present invention.

Figure 4:
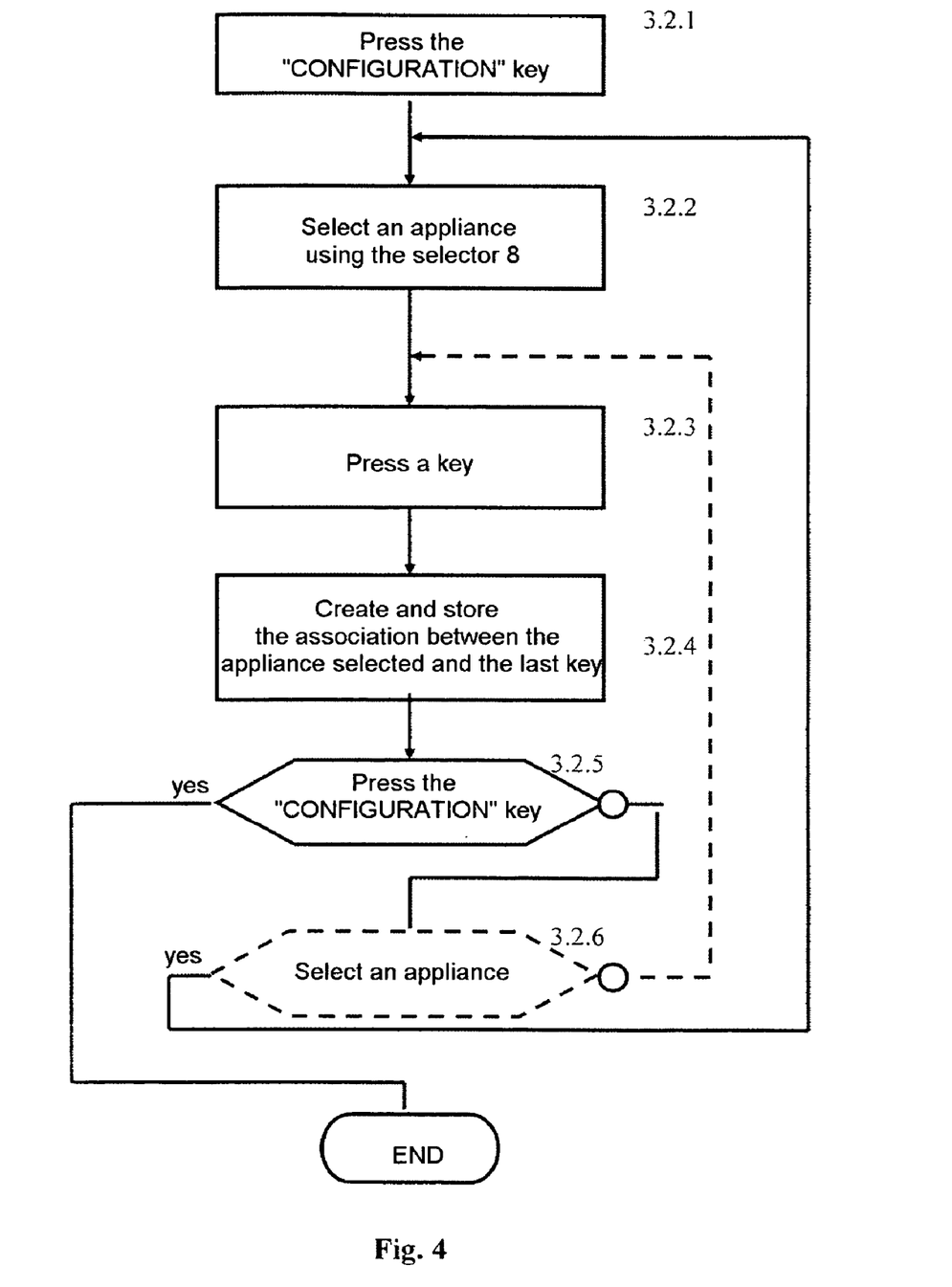
FIG. 4 is a flowchart representing the main steps for the implementation of a refinement of the present exemplary embodiment of the invention illustrated by FIG. 1.

FIG. 4 presents a flowchart of the operations to be performed in the course of step 3.2 of configuring the associations. In step 3.2.1, the user presses the "CONFIGURATION" key. Then in step 3.2.2, the user selects an appliance by positioning the selector 8. Next, in step 3.2.3, the user chooses a command by pressing the corresponding key, a "SOUND+" function key for example. Consequent upon these two operations, in step 3.2.4, the executable program associates the selected appliance with the command corresponding to the key depressed. The associations are recorded in a non-volatile part (of EEPROM type for example) of the memory 3 in the form of a table, the so-called "table of associations" of which this is the general structure:

TABLE 1

| Command | Appliance code |
|---|---|
| 1A - "SOUND+" | 03 |
| 1B - "SOUND-" | 03 |
| 45 - "PLAY" | 02 |
| 54 - "Off" | 01 |
| 57 - "On" | 01 |
| B0 - "Program-" | 01 |
| B1 - "Program+" | 01 |

The code of the command is advantageously that of the corresponding key. Table 1 performs the association of the codes in hexadecimal of keys and appliances. According to the example of the table above, the code of the television receiver is "01", that of the DVD reader is "02" and that of the amplifier is "03". The data of the table define that in MULTI mode the "Off", "On", "Program+" and "Program-" commands control the television receiver, the "PLAY" command controls the DVD reader and the "SOUND+" and "SOUND-" commands control the amplifier.

If in step 3.2.5, the user presses the "CONFIGURATION" key a second time the remote control exits the configuration mode while freezing the table 1 of associations. The table of associations will not be modifiable other than by returning to configuration mode. If the user activates the selector 8, either by pressing a pushbutton if the selector consists of pushbuttons, or by changing the position of the switch if the selector is embodied on the basis of such an element, the program loops to step 3.2.2 again and the user can perform another association. As a variant, steps 3.2.2 and 3.2.3 can be reversed, the user can thus first choose a key before associating it with an appliance.

A first refinement consists in transmitting the codes of the key to several appliances by multiplexing the signals and by transmitting them in repetitive bursts. In this case, table 1 can contain several codes of appliances for one and the same key. For example, if in the row corresponding to the "Off" key coded 56, the three appliances (coded 01, 02 and 03) are associated with this key, then the remote control can turn off the three appliances together. As a variant, the table of associations can exhibit one appliance per row, and all the codes of the keys associated with this appliance form a list contained in the second column of the table.

A refinement, represented by the dashed elements in FIG. 4 consists in making the program loop to step 3.2.3 so as to assign all the commands to one and the same appliance without having to designate the latter each time. The program tests in step 3.2.6 whether the user selects a command by pressing a key or whether he selects an appliance with the aid of the selector 8. In the first case, the program jumps to step 3.2.3 to perform a new association of a new command with the same appliance as before. In the second case, the program jumps to step 3.2.2 to perform a new association of a new key with a new appliance.

Another refinement consists in prohibiting certain associations. To prohibit such associations the table 1 is modified to contain a new column:

TABLE 2

| Command code (key) | Appliance code | Prohibited appliance code |
|---|---|---|
| 1A - "SOUND+" | 03 | 02 |
| 1B - "SOUND-" | 03 | 02 |
| 45 - "PLAY" | 02 | 01, 03 |
| 56 - "Off" | 01 | |
| 57 - "On" | 01 | |
| B0 - "Program-" | 01 | 02, 03 |
| B1 - "Program+" | 01 | 02, 03 |

The third column is programmed by the manufacturer of the remote control and is not modifiable. According to the example given by the values above, if the user in the course of the configuration step 3.2 associates the "PLAY" command with an audio amplifier, or with the television receiver, this association not being possible, the remote control transmits a visual or audible indication to the user, indicating an error. Typically, the "CONFIGURATION" key may not be associated with an appliance in particular, any attempt to associate with this key is doomed to fail. The visual indication is typically the flashing of one of the indicators 9 in red. The association is then not recorded in the memory. If the remote control is furnished with a touch screen, after the selection of an appliance, in a particularly advantageous manner, only the icons or the graphical representations of the permitted keys appear. Thus in a very simple manner, the user immediately sees on his keypad/touch screen the associations which can be programmed. A variant consists in the indication of an attempted prohibited association being signalled by a beeper emitting a brief sound.

Another refinement consists in defining several sets of associations. It is thus possible to associate a set with a determined user during the configuration step, this user creates his own associations. It is also possible to associate a set with a favoured appliance, for example the DVD or the VCR, according to one or other case the "PLAY", "STOP", "REV", "FWD", and "PAUSE" commands are intended to control the DVD or the VCR while other keys control other appliances. It is also possible to associate a set with a determined room of a residence, the step of configuration of such a set takes into account the appliances present in the room.

For this purpose, and in a manner known per se, the remote control possesses a means of entry of a code identifying a set, this means is for example a special key that the user depresses, then he enters a code which is generally a digit from 0 to 9 or a code with several digits using the keys from 0 to 9, to identify the set. This code identifies each column of the table of associations. The table of associations then takes the following structure:

TABLE 3

| Command code | Appliance code by set | | | |
|---|---|---|---|---|
| (key) | Set 1 | Set 2 | Set 3 | Set 4 |
| 1A - "SOUND+" | 03 | 01 | 01 | 01 |
| 1B - "SOUND-" | 03 | 01 | 01 | 01 |
| 45 - "PLAY" | 02 | 02 | 02 | 02 |
| 56 - "Off" | 01 | 01, 02 | 01, 02, 03 | 02 |
| 57 - "On" | 01 | 01, 02 | 01, 02, 03 | 02 |
| B0 - "Program-" | 01 | 01 | 01 | 01 |
| B1 - "Program+" | 01 | 01 | 01 | 01 |

During the configuration step, the associations entered are recorded in the column corresponding to the identified set. In the example of table 3 described hereinabove, four sets of associations are already entered. When a user places the remote control in MULTI mode, he next enters the code of a set after pressing the "special key", then the remote control searches through the column of the corresponding set to extract the right associations.

A variant of the latter refinement consists in deploying a selector 8 possessing several MULTI positions, typically three. These three positions are each associated with a specific set of associations. Another process consists in deploying a second selector presenting the user with various numerals. In the MULTI position, this second selector makes it possible to select a set of associations from amongst several.

Another refinement consists in associating one of the visual indicators 9 of the remote control with each appliance. These indicators are typically LED diodes which, for economic reasons, the remote control turns on only for a determined duration, five seconds for example or only the duration of pressing. The LED diode is placed just beside the appliance name screen-printed on the front face. When a user places the remote control in MULTI mode and then depresses a key, if one or more associations between this key and at least one appliance has been made during the configuration step 3.2, then the pilot light or lights corresponding to the appliances associated with this key are lit up. In this way, the user who does not always remember what he has programmed can immediately see which appliance is controlled by this key. A preferred exemplary embodiment consists in the selector 8 being constructed with as many pushbuttons as appliances and a two-position switch. The pushbuttons which make it possible to select an appliance contain a pilot light in their body. The switch makes it possible to activate or otherwise the MULTI mode, the position of the switch allows the user to immediately see whether or not he is in MULTI mode. When the user toggles the switch to return to normal mode, the appliance selected before the MULTI mode is again selected and its pilot light is lit up.

Another refinement consists in implementing a RESET function or function for erasing an association or a set of association. A first process consists in installing an "ERASE" key. In configuration mode, the user makes the same association as that programmed then presses the "ERASE" button, the association is then erased from the memory. A second process consists in deploying a RESET button which erases the entire memory containing the table of associations. A third process, advantageous if using a remote control with a touch screen, consists in using a menu which makes it possible easily to read out the associations performed and to erase them selectively.

Although the present invention has been described with reference to the particular embodiments illustrated, it is in no way limited by these embodiments, but is so merely by the appended claims. It will be noted that changes or modifications may be made by the person skilled in the art.

The invention claimed is:

1. A method of control of at least two electronic appliances with the aid of a remote device comprising means of control and a means of selection of an appliance from a plurality of appliances, wherein the method comprises the steps:

programming at least two associations between at least two means of control and at least two appliances of said plurality of appliances, activating the device in a first mode where the appliance selected by the means of selection is controlled by the means of control according to associations that are not programmed during the step of programming, activating the device in a second mode wherein at least two appliances are continuously controlled by the means of control according to the associations performed during the programming step, said activating in the second mode being triggered by inputting a command on the means of selection, and re-activating the device in a first mode by inputting a new command on the means of selection.

2. The method of control as claimed in claim 1, wherein the method comprises a step of commanding associations during the programming step prohibiting the programming of prohibited associations.

3. The method of control as claimed in claim 2, wherein an attempt to program a prohibited association triggers the transmission of an alert signal.

4. The method of control as claimed in claim 1, wherein the method comprises a step of displaying a visual identifier of an appliance, the visual identifier of an appliance being displayed when the device is in the second mode and when a user activates a means of control associated with the appliance.

5. The method of control as claimed in claim 1, wherein the programming step comprises selecting an appliance and selecting several means of control, the means of control being associated with the selected appliance.

6. The method of control as claimed in claim 1, wherein the programming step comprises selecting a means of control and selecting several appliances the selected appliances being associated with the means of control.

7. The method of control as claimed in claim 1, wherein the programming step makes it possible to define at least one set of associations, and wherein the method comprises a step of selecting a set of associations making it possible to activate the set when the device is in the second mode.

8. A device for remote control of at least two electronic appliances, comprising means of control and a means of selection of an appliance from a plurality of electronic appliances, each means of control being associated with a code predefined in the device, wherein said device comprises:

a means of programming at least two associations between at least two means of control and at least two appliances amongst the plurality of appliances, a means of activation of the device in a first mode wherein the appliance selected by the means of selection is controlled by the means of control according to associations that are not programmed by the means of programming, the activating of the device in the first mode being triggered by inputting a command on the means of selection, a means of activation of the device in a second mode wherein the programmed associations are activated and wherein at least two appliances are continuously controlled by the means of control according to the associations performed by the programming means, the activating of the device in a second mode being triggered by inputting a command on the means of selection.

9. The control device as claimed in claim 8, wherein the means of programming comprises a means of commanding the associations prohibiting the programming of prohibited associations.

10. The control device as claimed in claim 9, wherein the control device comprises a means of transmitting a visual or audible alert signal during an attempt to program a prohibited association.

11. The control device as claimed in claim 8, wherein the control device comprises a means of display of an identifier of the appliance, said means of display of an identifier of the appliance being activated when a means of control associated with the appliance is activated.

12. The control device as claimed in claim 8, wherein the control device comprises a means of display of an identifier of the appliance, the means of display being integrated into the means of selection of an appliance.

13. The control device as claimed in claim 8, wherein the means of programming selects at least one appliance from the plurality of appliances and then specifies keys of the control means that are associated with the selected appliance.

14. The control device as claimed in claim 8, wherein the programming means selects a key of the means of control to be programmed and then selects appliances to be associated with the selected key.

15. The control device as claimed in claim 9, wherein the control device comprises a touch screen displaying the permitted associations.

16. The control device as claimed in claim 8, wherein the control device comprises a means of selection of at least one set of associations, the programming means being adapted to program the set of associations selected by said means of selection, and in that the means of activation activates only the associations of the selected set.

17. The control device as claimed in claim 8, wherein the means of selection of an appliance comprises a switch including as many positions as appliances to be commanded plus a position activating the programmed associations.

18. The control device as claimed in claim 17, wherein the means of selection of a set of associations comprises a switch including as many positions as sets, the means of selecting sets being activated when the means of selection of an appliance is in the position activating the associations.

* * * * *

UNITED STATES PATENT AND TRADEMARK OFFICE
CERTIFICATE OF CORRECTION

PATENT NO.       : 7,605,713 B2                             Page 1 of 1
APPLICATION NO.  : 10/528597
DATED            : October 20, 2009
INVENTOR(S)      : Trinchero et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 813 days.

Signed and Sealed this

Fifth Day of October, 2010

David J. Kappos
*Director of the United States Patent and Trademark Office*